(12) United States Patent
Obinata

(10) Patent No.: US 6,802,230 B2
(45) Date of Patent: Oct. 12, 2004

(54) VEHICLE TRANSMISSION

(75) Inventor: Jiro Obinata, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 84 days.

(21) Appl. No.: 09/946,963

(22) Filed: Sep. 6, 2001

(65) Prior Publication Data

US 2002/0033062 A1 Mar. 21, 2002

(30) Foreign Application Priority Data

Sep. 8, 2000 (JP) .......................................... 2000-273889

(51) Int. Cl.[7] ................................................ F16H 3/06
(52) U.S. Cl. ..................................... 74/410; 74/606 R
(58) Field of Search ............................... 74/410, 606 R, 74/325, 331, 333, 341, 342, 352

(56) References Cited

U.S. PATENT DOCUMENTS

| | | | | |
|---|---|---|---|---|
| 2,057,073 A | * | 10/1936 | Vandervoort | 74/333 |
| 2,774,451 A | * | 12/1956 | Stump | 74/333 |
| 3,563,105 A | * | 2/1971 | Graziosi | 74/410 |
| 3,772,934 A | | 11/1973 | Warren | |
| 3,885,446 A | * | 5/1975 | Pengilly | 74/331 |
| 4,025,136 A | | 5/1977 | Ballendux | |
| 4,385,846 A | | 5/1983 | Knauss | |
| 4,653,346 A | | 3/1987 | Kato et al. | |
| 5,588,328 A | * | 12/1996 | Nihei et al. | 74/409 |
| 2002/0033061 A1 | * | 3/2002 | Gotoh | 74/410 |

FOREIGN PATENT DOCUMENTS

| | | |
|---|---|---|
| DE | 30 18 610 | 12/1981 |
| JP | 11-82646 | 3/1999 |

OTHER PUBLICATIONS

Patent Abstracts of Japan, vol. 1996, No. 05, May 31, 1996 & JP 08 021489 A (FANUC Ltd.), Jan. 23, 1996, abstract.
Patent Abstracts of Japan, vol. 2000, No. 1, Jan. 31, 2000 & JP 11 270636 A (Sumitomo Heavy Ind. Ltd; Ueda Haguruma KK), Oct. 5, 1999, abstract.
Patent Abstracts of Japan, vol. 1999, No. 08, Jun. 30, 1999 & JP 11 082646A (Aisin AW Co. Ltd), Mar. 26, 1999, whole document.

* cited by examiner

*Primary Examiner*—William C. Joyce
(74) *Attorney, Agent, or Firm*—Armstrong, Kratz, Quintos, Hanson & Brooks, LLP

(57) ABSTRACT

A transmission for a vehicle having a sub shaft supported in casings via bearings, and an input gear, an output gear, and a boss of a clutch outer, etc. stacked on the sub shaft and retained by a cotter key. The input gear and the output gear are helical gears, and thrust forces acting on the two gears are generated in opposite directions. A rightward thrust force acting on the input gear is borne by the casing via an annular projection, the sub shaft and the bearing, and a leftward force acting on the output gear, which is separated from the cotter key by a gap, is borne by the casing via the bearing provided on the side face of the output gear. This arrangement eliminates any need for fixing gears supported on a shaft of a transmission by a nut or a bolt in the axial direction, thus saving space and reducing the number of parts.

2 Claims, 6 Drawing Sheets

VEHICLE TRANSMISSION

BACKGROUND OF THE INVENTION

1. Field of the Invention

The present invention relates to a vehicle transmission in which a group of parts including at least an input gear and an output gear are stacked and supported on a shaft supported in a casing via at least a pair of bearings, and a torque that has been input to the input gear is output from the output gear.

2. Description of the Related Art

Assembled around a main shaft or a counter shaft of an automatic transmission in order to establish each of the gear shift stages are parts including, for example, a gear, a clutch outer and a clutch inner of a hydraulic clutch for engaging the gear with the shaft, and bearings for supporting the shaft in a casing. Such a plurality of parts are stacked on the shaft, the parts are retained at one end by a step formed on the shaft, and are retained at the other end by means of a nut screwed into the outer circumference of the shaft, as disclosed in Japanese Patent Application Laid-open No. 11-82646.

SUMMARY OF THE INVENTION

In an automatic transmission, the use of helical gears is preferred, because of their low engagement noise. A helical gear is characterized by receiving a thrust force accompanying the transmission of a torque. When two helical gears supported on a shaft experience thrust forces that are generated in opposite directions, not only is it necessary to secure the helical gears to the shaft by a large nut or bolt that can withstand the thrust forces, but it is also necessary to employ means for preventing the nut or bolt from loosening.

The present invention has been carried out in view of the above-mentioned circumstances and it is an object of the present invention to eliminate the necessity of fixing helical gears supported on a shaft of a transmission by a nut or a bolt in the axial direction, thus saving space and reducing the number of parts.

In order to achieve the above-mentioned object, the present invention is directed to a vehicle transmission in which a group of parts including at least an input gear and an output gear are stacked and supported on a shaft supported in casings via at least one pair of bearings and a torque that has been input to the input gear is output from the output gear, wherein the input gear and the output gear are helical gears, thrust forces acting on the input gear and the output gear are generated in opposite directions, the thrust force acting on one gear is borne by the casing via a shaft end of the shaft, and the thrust force acting on another gear is borne by the casing via a side of the gear.

In accordance with the above-mentioned arrangement, the input gear and the output gear supported on the shaft are helical gears, and when they experience the thrust forces in opposite directions, the thrust force acting on the one gear is borne by the casing via the shaft end, and the thrust force acting on the other gear is borne by the casing via the side of the gear. It is therefore unnecessary to fix the two gears to the shaft by a bolt or a nut and to employ means for preventing the bolt or nut from loosening. Space can thus be saved and the number of parts can be reduced.

The present invention is also directed to a vehicle transmission wherein a retaining part provided integrally on the shaft restricts movement of the one gear in the direction in which the one gear departs from the other gear, and a retaining means detachably provided on the shaft restricts movement of the other gear in the direction in which the other gear departs from the one gear.

In accordance with the above-mentioned arrangement, because the retaining part provided integrally on the shaft restricts movement of the one gear in the direction in which the one gear departs from the other gear, the thrust force acting on the one gear can be transmitted to the shaft and borne by the casing. Moreover, because the retaining means detachably provided on the shaft restricts movement of the other gear in the direction in which the other gear departs from the one gear, it is possible to provisionally assemble the other gear on the shaft while preventing the other gear and the group of parts from dropping off the shaft, thus enhancing ease of assembly.

A torque converter case 11 and a transmission case 12 in the embodiment below correspond to the casings of the present invention, a sub-shaft drive fourth gear 34 in the embodiment corresponds to the input gear or the one gear of the present invention, a second sub third speed gear 46 in the embodiment corresponds to the output gear or the other gear of the present invention, a ball bearing 20, a roller bearing 21 and a thrust bearing 69 in the embodiment correspond to the bearings of the present invention, a second sub-shaft Ss2 in the embodiment corresponds to the shaft of the present invention, an annular projection 61 in the embodiment corresponds to the retaining part of the present invention, and a cotter 67 in the embodiment corresponds to the retaining means of the present invention.

BRIEF DESCRIPTION OF THE DRAWINGS

The present invention is described below by reference to a preferred exemplary embodiment of the present invention, as shown in the attached drawings.

FIG. 1 is a skeleton diagram showing a four parallel shaft type automatic transmission;

FIG. 2 is a map showing the positions of FIGS. 3 and 4;

FIG. 3 is a detailed diagram of section A in FIG. 2;

FIG. 4 is a detailed diagram of section B in FIG. 2;

FIG. 5 is a magnified diagram of the essential part of FIG. 3; and

FIG. 6 is a diagram for explaining the action of the above-mentioned four parallel shaft type automatic transmission.

DETAILED DESCRIPTION OF THE PREFERRED EMBODIMENTS

Figure 1:
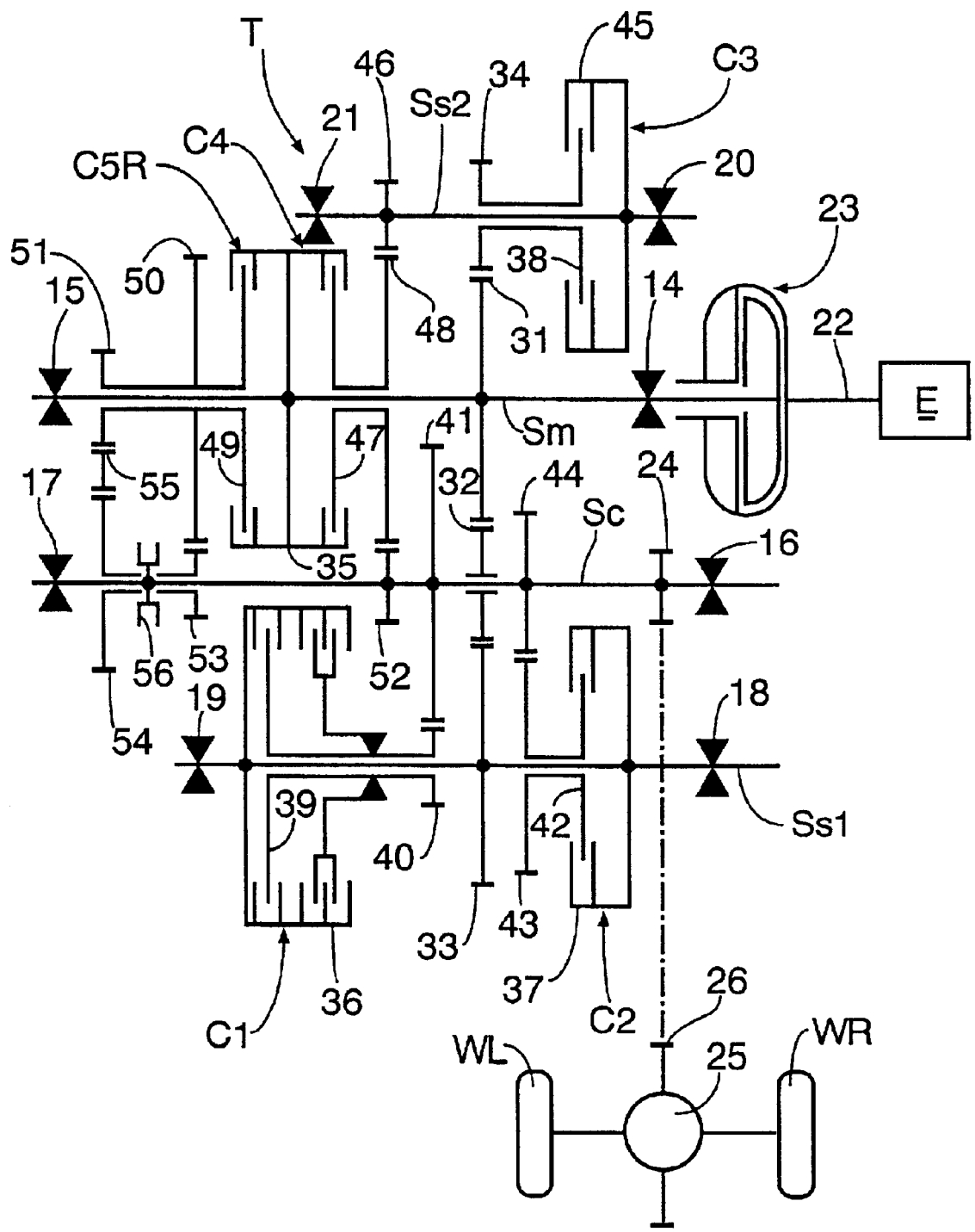
FIGS. 1 to 6 illustrate one embodiment of the present invention, where
Figure 2:
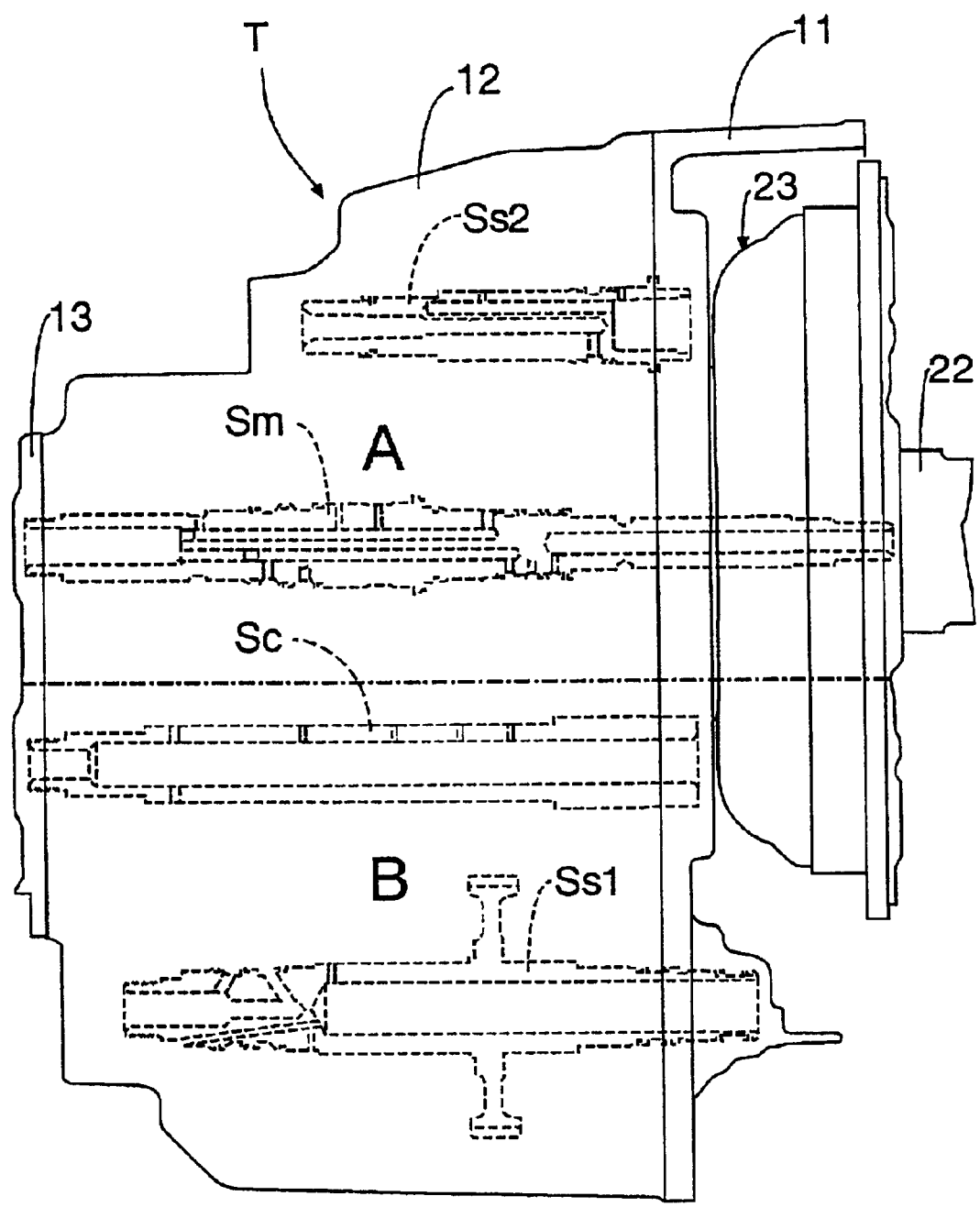
Figure 3:
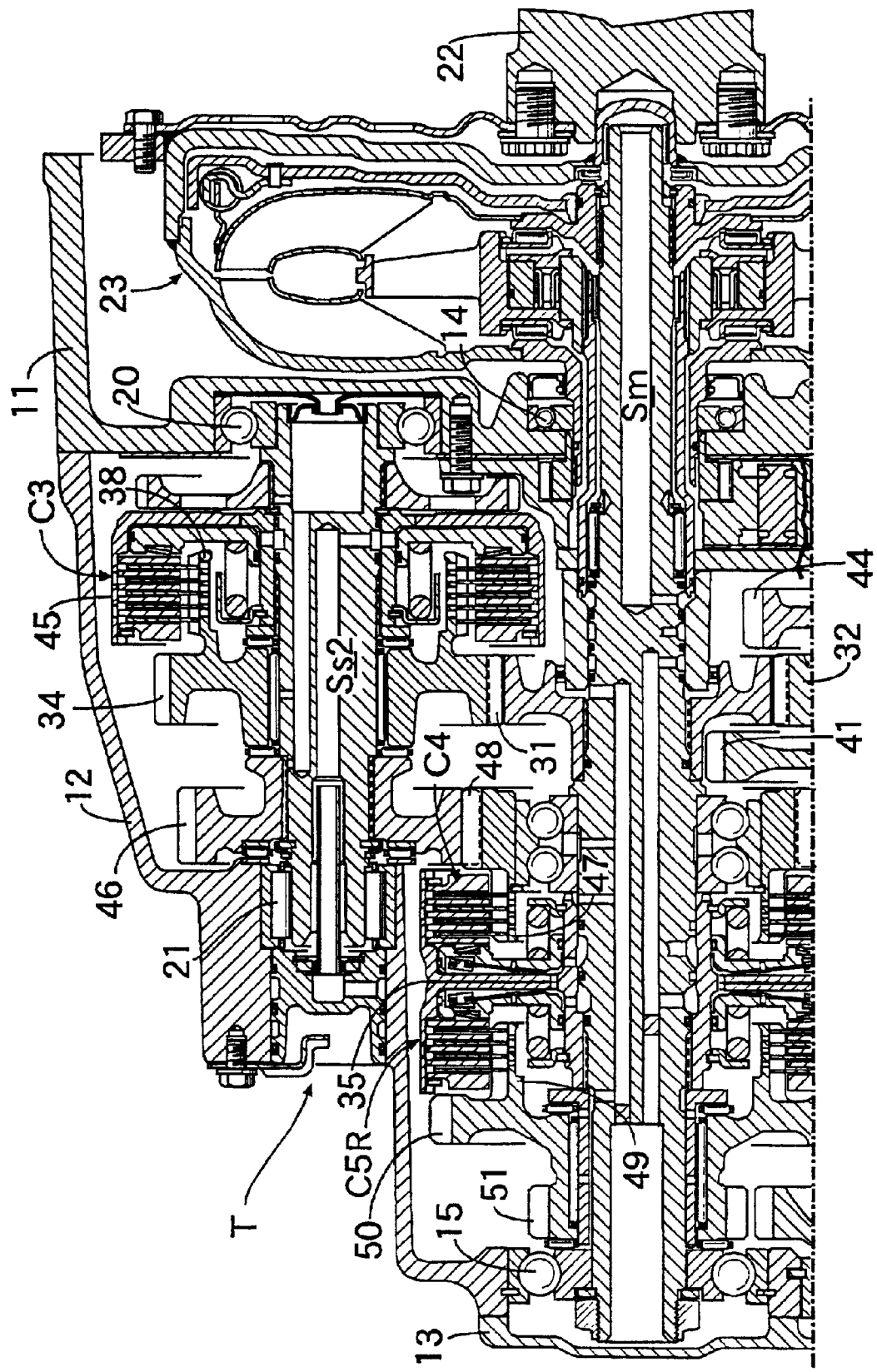
Figure 4:
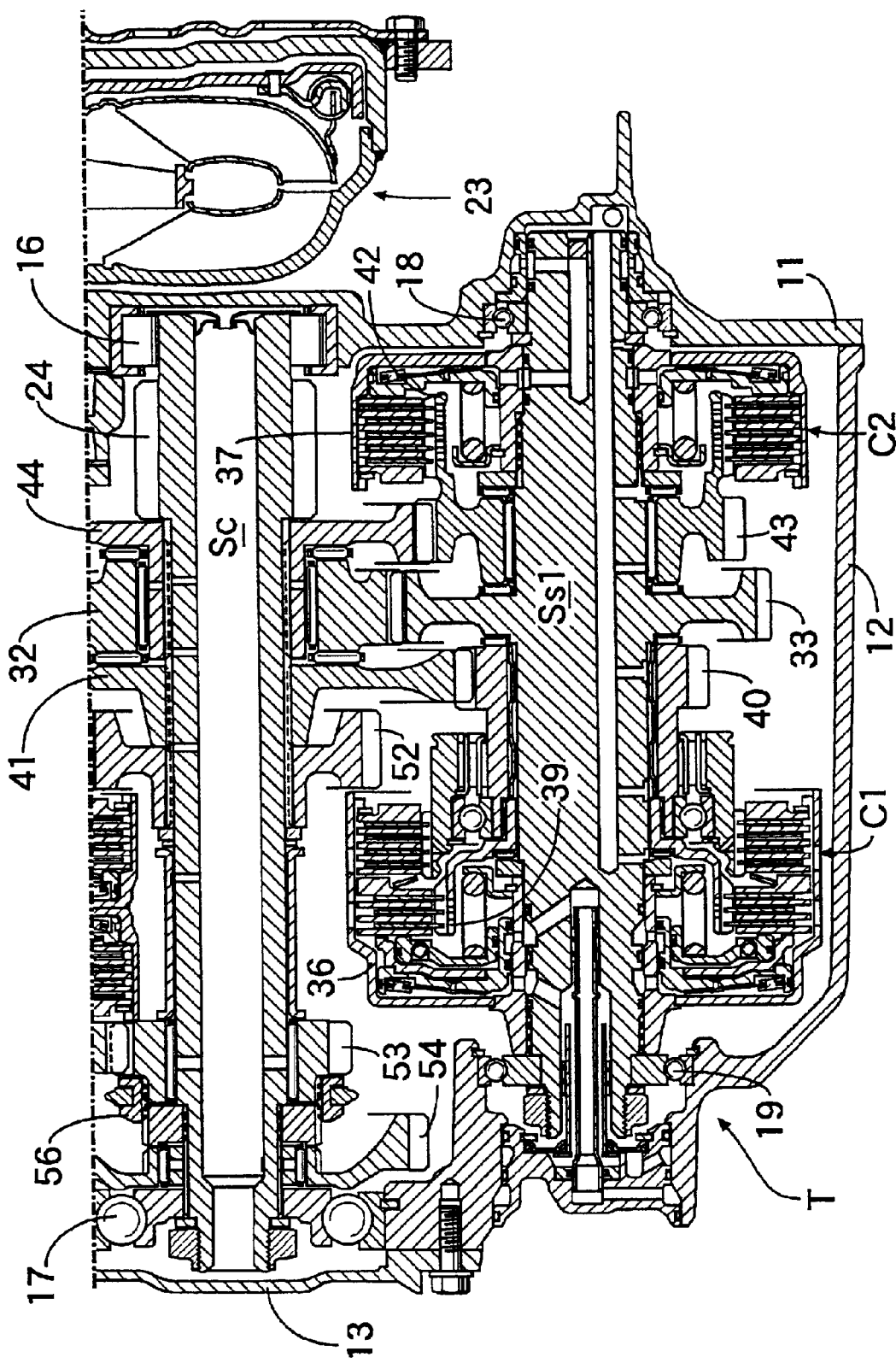

As shown in FIGS. 1 to 4, the outer periphery of a four parallel shaft type automatic transmission T connected to the left-hand side face of an engine E comprises a torque converter case 11, a transmission case 12 and a case cover 13. The torque converter case 11 and the transmission case 12 support a main shaft Sm via ball bearings 14 and 15, a counter shaft Sc via a roller bearing 16 and a ball bearing 17, a first sub-shaft Ss1 via ball bearings 18 and 19, and a second sub-shaft Ss2 via a ball bearing 20 and a roller bearing 21. The main shaft Sm is connected to a crankshaft 22 of the engine E via a torque converter 23. A final drive gear 24 integral with the counter shaft Sc is meshed with a final driven gear 26 fixed on the outer periphery of a differential gear box 25 so as to drive right and left driven wheels WR and WL.

In order to establish a first speed gear shift stage to a fifth speed gear shift stage and a reverse gear shift stage by transmitting the rotation of the main shaft Sm to the counter shaft Sc at the respective gear ratios, a first speed clutch C1 and a second speed clutch C2 are provided on the first sub-shaft Ss1, a third speed clutch C3 is provided on the second sub-shaft Ss2, and a fourth speed clutch C4 and a fifth speed—reverse clutch C5R are provided on the main shaft Sm. A sub-shaft drive first gear 31 integral with the main shaft Sm is meshed with a sub-shaft drive second gear 32 supported on the counter shaft Sc in a relatively rotatable manner, this sub-shaft drive second gear 32 is meshed with a sub-shaft drive third gear 33 integral with the first sub-shaft Ss1, and the above-mentioned sub-shaft drive first gear 31 is meshed with a sub-shaft drive fourth gear 34 supported on the second sub-shaft Ss2 in a relatively rotatable manner.

Even when the first speed clutch C1 to the fifth speed—reverse clutch C5R are in a disengaged state, each of the parts explained below always rotates as a result of being operable in association with rotation of the main shaft Sm. That is to say, the sub-shaft drive first gear 31 integral with the main shaft Sm and a clutch outer 35 integral with the main shaft Sm, the clutch outer 35 being common to both the fourth speed clutch C4 and the fifth speed—reverse clutch C5R, always rotate, and the sub-shaft drive second gear 32 of the counter shaft Sc that is meshed with the sub-shaft drive first gear 31 of the main sub-shaft Sm always rotates. The first sub-shaft Ss1 having the integral sub-shaft drive third gear 33 meshed with the above-mentioned sub-shaft drive second gear 32 always rotates and the clutch outers 36 and 37 of the first speed clutch C1 and the second speed clutch C2 provided on this first sub-shaft Ss1 also always rotate. The sub-shaft drive fourth gear 34 supported on the second sub-shaft Ss2 in a relatively rotatable manner and meshed with the sub-shaft drive first gear 31, and a clutch inner 38 of the third speed clutch C3 connected integrally to this sub-shaft drive fourth gear 34 also always rotate.

A first sub first speed gear 40 integral with a clutch inner 39 of the first speed clutch C1 provided on the first sub-shaft Ss1 is meshed with a counter first speed gear 41 integral with the counter shaft Sc. A first sub second speed gear 43 integral with a clutch inner 42 of the second speed clutch C2 provided on the first sub-shaft Ss1 is meshed with a counter second speed gear 44 integral with the counter shaft Sc. A clutch outer 45 of the third speed clutch C3 and a second sub third speed gear 46 are integrally provided on the second sub-shaft Ss2. A main third speed—fourth speed gear 48 integral with a clutch inner 47 of the fourth speed clutch C4 provided on the main shaft Sm is meshed with the above-mentioned second sub third speed gear 46 integral with the second sub-shaft Ss2. A main fifth speed gear 50 and a main reverse gear 51 are provided integrally with a clutch inner 49 of the fifth speed—reverse clutch C5R provided on the main shaft Sm.

A counter third speed—fourth speed gear 52 integral with the counter shaft Sc is meshed with the above-mentioned main third speed—fourth speed gear 48. A counter fifth speed gear 53 and a counter reverse gear 54 are supported on the counter shaft Sc in a relatively rotatable manner, the counter fifth speed gear 53 is meshed with the above-mentioned main fifth speed gear 50, and the counter reverse gear 54 is meshed with the above-mentioned main reverse gear 51 via a reverse idle gear 55 (see FIG. 1). The counter fifth speed gear 53 and the counter reverse gear 54 on the counter shaft Sc can be selectively coupled to the counter shaft Sc by means of a chamfer 56.

When the first speed clutch C1 is engaged so as to establish a first speed gear shift stage, the rotation of the main shaft Sm is transmitted to the driven wheels WR and WL through the sub-shaft drive first gear 31, then the sub-shaft drive second gear 32, the sub-shaft drive third gear 33, the first sub-shaft Ss1, the clutch outer 36 and the clutch inner 39 of the first speed clutch C1, the first sub first speed gear 40, the counter first speed gear 41, the counter shaft Sc, the final drive gear 24, the final driven gear 26 and the differential gear box 25.

When the second speed clutch C2 is engaged so as to establish a second speed gear shift stage, the rotation of the main shaft Sm is transmitted to the driven wheels WR and WL through the sub-shaft drive first gear 31, then the sub-shaft drive second gear 32, the sub-shaft drive third gear 33, the first sub-shaft Ss1, the clutch outer 37 and the clutch inner 42 of the second speed clutch C2, the first sub second speed gear 43, the counter second speed gear 44, the counter shaft Sc, the final drive gear 24, the final driven gear 26 and the differential gear box 25.

When the third speed clutch C3 is engaged so as to establish a third speed gear shift stage, the rotation of the main shaft Sm is transmitted to the driven wheels WR and WL through the sub-shaft drive first gear 31, then the sub-shaft drive fourth gear 34, the clutch inner 38 and the clutch outer 45 of the third speed clutch C3, the second sub-shaft Ss2, the second sub third speed gear 46, the main third speed—fourth speed gear 48, the counter third speed—fourth speed gear 52, the counter shaft Sc, the final drive gear 24, the final driven gear 26 and the differential gear box 25.

When the fourth speed clutch C4 is engaged so as to establish a fourth speed gear shift stage, the rotation of the main shaft Sm is transmitted to the driven wheels WR and WL through the clutch outer 35 and the clutch inner 47 of the fourth speed clutch C4, the main third speed—fourth speed gear 48, the counter third speed—fourth speed gear 52, the counter shaft Sc, the final drive gear 24, the final driven gear 26 and the differential gear box 25.

When the fifth speed—reverse clutch C5R is engaged so as to establish a fifth speed gear shift stage in a state in which the counter fifth speed gear 53 is coupled to the counter shaft Sc by means of the chamfer 56, the rotation of the main shaft Sm is transmitted to the driven wheels WR and WL through the clutch outer 35 and the clutch inner 49 of the fifth speed—reverse clutch C5R, the main fifth speed gear 50, the counter fifth speed gear 53, the counter shaft Sc, the final drive gear 24, the final driven gear 26 and the differential gear box 25.

When the fifth speed—reverse clutch C5R is engaged so as to establish a reverse gear shift stage in a state in which the counter reverse gear 54 is coupled to the counter shaft Sc by means of the chamfer 56, the rotation of the main shaft Sm is transmitted to the driven wheels WR and WL through the clutch outer 35 and the clutch inner 49 of the fifth speed—reverse clutch C5R, the main reverse gear 51, the reverse idle gear 55, the counter reverse gear 54, the counter shaft Sc, the final drive gear 24, the final driven gear 26 and the differential gear box 25.

Figure 5:
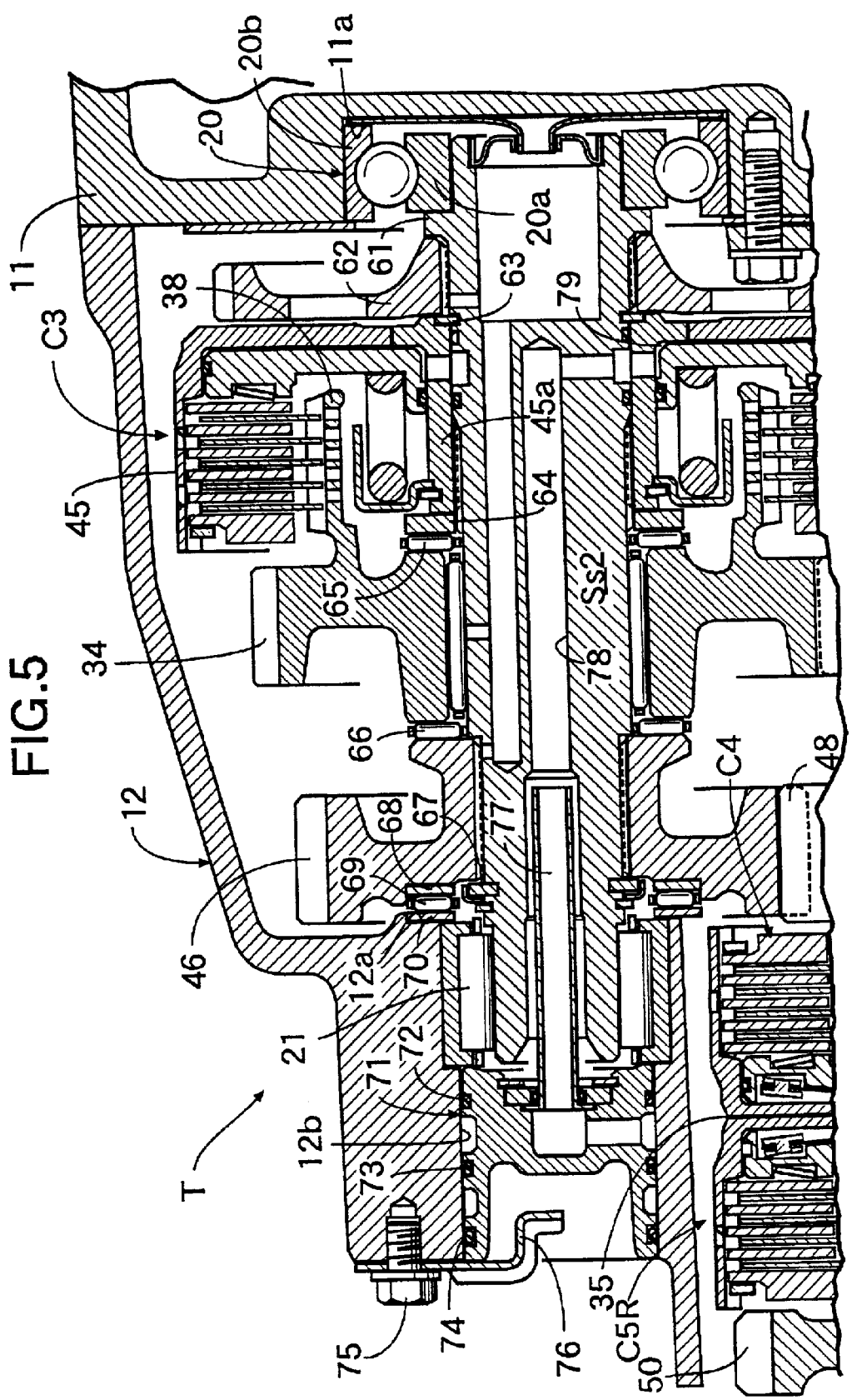

As is clear from FIG. 5, an annular projection 61 is formed on the outer periphery of the second sub-shaft Ss2 at its right end, an inner race 20a of the ball bearing 20 is in contact with the right-hand side face of the annular projection 61, and an outer race 20b is in contact with a step 11a of the torque converter case 11. On the left-hand side face of the annular projection 11 are stacked in the axial direction a parking gear 62, a clip 63, a boss 45a of the clutch outer 45 of the third speed clutch C3, a thrust washer 64, a thrust bearing 65, the sub-shaft drive fourth gear 34, a thrust bearing 66 and the second sub third speed gear 46 in that order, and the left-hand side face of the second sub third speed gear 46 is retained on the second sub-shaft Ss2 by means of a cotter key 67. Between the left-hand side face of the second sub third speed gear 46 and a step 12a of the transmission case 12 are disposed a thrust washer 68 for adjusting clearance, a thrust bearing 69 and a thrust washer 70. Since there is a small gap between the cotter key 67 and the second sub third speed gear 46, the second sub third speed gear 46 can slide relative to the second sub-shaft Ss2 within the compass of the above-mentioned gap.

The left end of the second sub-shaft Ss2, which projects leftward relative to the second sub third speed gear 46, is supported in the transmission case 12 via the roller bearing 21. Fitted via three O rings 72, 73 and 74 into an opening 12b of the transmission case 12, the opening being located next to the left end face of the second sub-shaft Ss2, is a feed pipe cap 71. The feed pipe cap 71 is prevented from rotating and falling out by a stay 76 fixed to the transmission case 12 by means of a bolt 75. An end of a feed pipe 77 is fixed to the feed pipe cap 71 and the other end thereof extends within an oil passage 78 formed in the center of the second sub-shaft Ss2 so that an operating fluid can be supplied to a clutch oil chamber 79 of the third speed clutch C3. Variations in the thickness of the boss 45a of the clutch outer 45, the thrust washer 64, the thrust bearing 65, the sub-shaft drive fourth gear 34, the thrust bearing 66, the second sub third speed gear 46, the thrust bearing 69 and the thrust washer 70 can be absorbed by selecting and mounting the thrust washer 68 having an appropriate thickness for adjusting the clearance.

Figure 6:
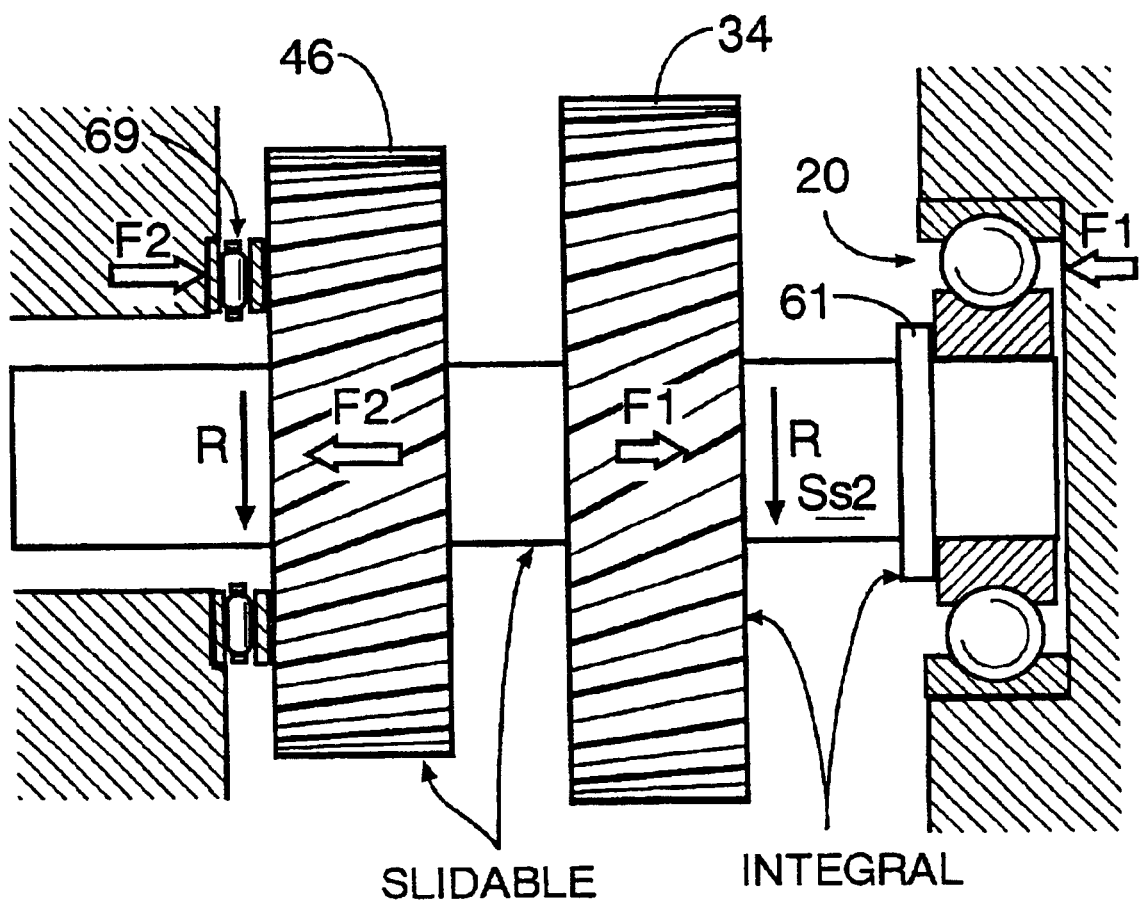

As is clear from FIG. 6, because each of the gears of the automatic transmission T including the sub-shaft drive fourth gear 34 and the second sub third speed gear 46 is a helical gear which causes only a small engagement noise, thrust forces act on the engaged parts accompanying the transmission of a torque. When a third speed gear shift stage is established and the second sub-shaft Ss2 transmits a torque, the sub-shaft drive fourth gear 34 and the second sub third speed gear 46 rotate in the direction of arrows R. Since the teeth of the sub-shaft drive fourth gear 34 and the teeth of the second sub third speed gear 46, which are helical gears, are both inclined downward and to the left in the figure, the sub-shaft drive fourth gear 34 driven by the sub-shaft drive first gear 31, experiences a thrust force F1 in the rightward direction in the figure, and the second sub third speed gear 46 driving the main third speed—fourth speed gear 48, experiences a thrust force F2 in the leftward direction in the figure.

If, in this case, the diameter of the sub-shaft drive fourth gear 34 is equal to that of the second sub third speed gear 46, the two thrust forces F1 and F2, which are generated in opposite directions, have an identical absolute value. However, in fact, because the engagement counter force of the second sub third speed gear 46 which has a smaller diameter, is greater, the thrust force F2 experienced by the second sub third speed gear 46 is slightly greater than the thrust force F1 experienced by the sub-shaft drive fourth gear 34. The thrust force F1 pushing the sub-shaft drive fourth gear 34 rightward acts on the annular projection 61 via the thrust bearing 65, the thrust washer 64, the boss 45a of the clutch outer 45, the clip 63 and the parking gear 62 so pushing the second sub-shaft Ss2 rightward. The thrust force F1 pushing the second sub-shaft Ss2 rightward is supported by the torque converter case 11 via the ball bearing 20 provided on the shaft end of the second sub-shaft Ss2.

On the other hand, because there is a small gap between the second sub third speed gear 46 supported on the second sub-shaft Ss2 and the cotter key 67, the leftward thrust force F2 acting on the second sub third speed gear 46 is borne by the transmission case 12 from the left-hand side face of the second sub third speed gear 46 via the thrust bearing 69 without being transmitted to the second sub-shaft Ss2 via the cotter key 67.

As hereinbefore described, all of the thrust forces F1 and F2 acting on the sub-shaft drive fourth gear 34 and the second sub third speed gear 46 are borne by the torque converter case 11 and the transmission case 12, and it is therefore unnecessary to employ a nut or a bolt as required in the prior art. That is to say, it is unnecessary to employ a fastening member for fixing the parking gear 62, the boss 45a of the clutch outer 45, the thrust washer 64, the thrust bearing 65, the sub-shaft drive fourth gear 34, the thrust bearing 66 and the second sub third speed gear 46 to the left-hand side face of the annular projection 61, and a member for preventing the fastening member from rotating. It is thus possible to contribute to a saving of space and a reduction in the number of parts.

As described above, the cotter key 67 is separated from the second sub third speed gear 46 by a small gap and does not contribute to bearing the thrust forces F1 and F2. The function of the cotter key 67 is to enhance the ease of assembly when preliminarily assembling the parking gear 62, the boss 45a of the clutch outer 45, the thrust washer 64, the thrust bearing 65, the sub-shaft drive fourth gear 34, the thrust bearing 66 and the second sub third speed gear 46 around the second sub-shaft Ss2 while preventing these members from dropping off the second sub-shaft Ss2.

A preferred exemplary embodiment of the present invention has been described in detail above, but the present invention can be modified in a variety of ways without departing from the spirit and scope of the invention.

For example, the embodiment illustrates an automatic transmission T, but the present invention can be applied to a manual transmission. It is also possible to employ another retaining member such as a circlip instead of the cotter key 67.

What is claimed is:

1. A vehicle transmission comprising:

a group of parts including at least an input gear and an output gear which are stacked and supported on a shaft supported in casings via at least one pair of bearings, a torque that has been input to the input gear being output from the output gear, wherein:

the input gear and the output gear are helical gears;

first and second thrust forces acting on the input gear and the output gear, respectively, are generated in opposite directions;

one of said first thrust force and said second thrust force is borne by the casing via a shaft end of the shaft;

the other of said first thrust force and said second thrust force is borne by the casing via a side of the output gear;

a retaining part integrally formed on the shaft for restricting movement of one of the input gear and the output gear in the direction in which the one departs from the other; and a retaining means detachably provided on the shaft for restricting movement of the other of the input gear and the output gear in the direction in which the other departs from the one, wherein a thrust bearing is interposed between the casing and the output gear so as to engage only the casing and the output gear.

2. The vehicle transmission according to claim 1, wherein said detachable retaining means comprises a cotter key.

* * * * *